(12) United States Patent
Grosspietsch et al.

(10) Patent No.: US 7,796,948 B2
(45) Date of Patent: Sep. 14, 2010

(54) METHOD AND APPARATUS FOR OPTIMIZING RADIO PERFORMANCE THROUGH INFERRED KNOWLEDGE OF INDOOR-OUTDOOR RADIO STATUS

(75) Inventors: John K. Grosspietsch, Libertyville, IL (US); Charles A. Backof, Jr., Boca Raton, FL (US); Lawrence M. Ecklund, Wheaton, IL (US); Louis J. Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 643 days.

(21) Appl. No.: 11/610,096

(22) Filed: Dec. 13, 2006

(65) Prior Publication Data

US 2008/0146153 A1 Jun. 19, 2008

(51) Int. Cl.
H04B 17/00 (2006.01)
(52) U.S. Cl. ...................... 455/62; 455/67.11
(58) Field of Classification Search ............... 455/435.1, 455/435.2, 3.02, 422.1; 250/214, 221
See application file for complete search history.

(56) References Cited

U.S. PATENT DOCUMENTS

| 4,194,202 | A | * | 3/1980 | Doyle .......................... 102/214 |
| 5,227,764 | A | * | 7/1993 | Umemoto ................... 340/552 |
| 5,684,294 | A | * | 11/1997 | Kouhi ................... 250/214 AL |
| 5,930,726 | A | | 7/1999 | Fujita |
| 2004/0160370 | A1 | * | 8/2004 | Ghosh et al. ................. 343/702 |
| 2005/0148330 | A1 | * | 7/2005 | Alberth et al. ........... 455/435.1 |
| 2005/0181805 | A1 | | 8/2005 | Gallagher |
| 2006/0068699 | A1 | * | 3/2006 | Lee et al. ................. 455/422.1 |
| 2006/0085654 | A1 | | 4/2006 | Nokkonen |
| 2008/0074059 | A1 | * | 3/2008 | Ahmed ....................... 315/291 |

FOREIGN PATENT DOCUMENTS

JP 2005312528 A * 11/2005
JP 2006217485 A * 8/2006

OTHER PUBLICATIONS

"Palm Treo 650 Cell Phone" (LetsTalk catalog web site as of 2006) located at http://web.archive.org/web/20060313154345/www.letstalk.com/product/product.htm?prId=27762.*
PCT/US2007/081709—International Search Report with Written Opinion, mailed Jul. 2008—8 pages.
PCT/US2007/081709—International Preliminary Report, mailed Jun. 2009—8 pages.

* cited by examiner

Primary Examiner—Matthew D Anderson
Assistant Examiner—Gennadiy Tsvey

(57) ABSTRACT

Performance of a radio device is optimized by estimating if the device is inside a building. One or more sensors on the radio device are used to measure an environmental quantities relating to the environment of the radio device. The likelihood of the radio device being inside a building is inferred from these measurements. The operation of the radio device then is controlled accordingly. For example, if the radio device is determined to be inside a building, a low operating frequency may be selected for the radio device if a wide area network connection is required, while a high operating frequency may be selected if a local connection is required. An environmental quantity may be, for example, a satellite signal, ambient light, temperature, RF energy, or the response to a test signal emitted by the radio device.

16 Claims, 3 Drawing Sheets

METHOD AND APPARATUS FOR OPTIMIZING RADIO PERFORMANCE THROUGH INFERRED KNOWLEDGE OF INDOOR-OUTDOOR RADIO STATUS

FIELD OF THE INVENTION

The present invention relates generally to radio communication systems.

BACKGROUND

Wide area communications systems, such as cellular telephone systems, operate at very high radio frequencies (RF). Such high frequency radio signals often are not capable of penetrating into buildings. As a consequence, radio devices that operate by connecting to external wide area networks will not work well, or may fail to work at all, when inside a building.

Radios that communicate with each other over short ranges in a building are susceptible to interference if they select operating frequencies which allow strong external transmitter signals to penetrate well into buildings. Radio devices that are capable of operating on multiple frequencies could potentially operate with improved performance if they select an appropriate operating frequency based on whether they are indoors or not and whether they want to connect to another device in a building or to an external, out of building device or network. However mobile radio devices do not have mechanisms to determine if they are in a building, and typically operate in the fixed manner whether indoors or outdoors.

Existing radio devices can detect a loss in signal. In some systems, that detection is then used to trigger a search for an alternate network or an alternate device to connect with. If an in-building system, such as a wireless local area network (WLAN), is available a device can potentially make use of that system. However, compatible WLAN systems are not available in every building and every location in a building.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
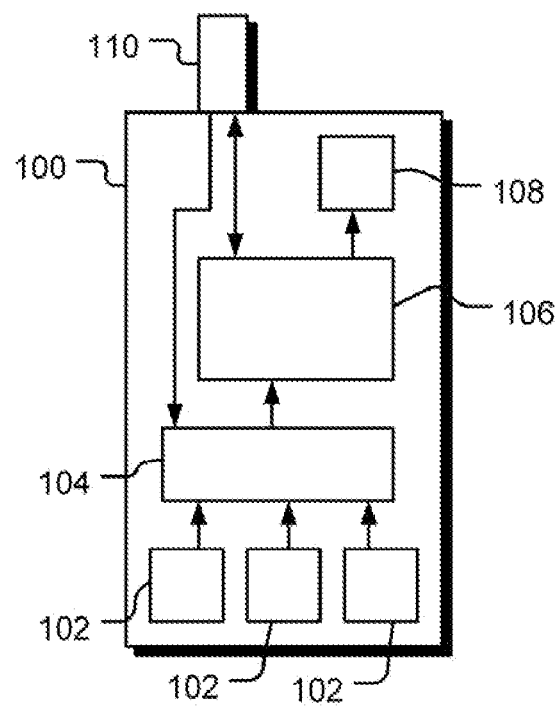
FIG. 1 is a diagram of an exemplary radio device in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the optimization of radio communication. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of sensing the environment described herein. The non-processor circuits may include, but are not limited to, a radio receiver, a radio transmitter, signal drivers, clock circuits, power source circuits, and user input devices. As such, these functions may be interpreted as a method to optimize radio communication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In accordance with some embodiments of the invention, a radio device is capable of inferring if it is indoors or outdoors based on combining a number of separate measurements or sensed environmental conditions. The values that are measured are indirect indicators of whether a device is indoors. Performance of the radio device is optimized for the inferred operating environment.

In accordance with an embodiment, a radio device includes a sensor operable to sense a environmental quantity relating to the environment of the radio device to produce a sensor signal, an inference unit responsive to the sensor signal and operable to infer a probability of the radio device being inside a building, the inference being dependent upon the environmental quantity, and a processor operable to control the modulation mode of the radio device, dependent upon the probability of the radio device being inside a building, to optimize performance of the radio device. The radio device operates by measuring an environmental quantity relating to the environment of the radio device using a sensor of the radio device, inferring, from the measured environmental quantity, a probability of the radio device being inside a building. If the radio device is determined to be inside a building, the radio device selects a low operating frequency for the radio device if a wide area network connection is required, and selects a high operating frequency for the radio device if a local connection is required.

FIG. 1 is a diagram of an exemplary radio device 100. The radio device 100, which may be a mobile or handheld device, portable computer, personal digital assistant (PDA), two-way radio or cellular telephone for example, includes one or more sensors 102 that are operable to sense environmental quantities that are indirectly related to whether the radio device is indoors or outdoors. An inference unit 104 receives signals from the sensors 102 and infers a probability or likelihood that the radio device is in indoors or outdoors. The inference information is passed a processor or controller 106 of the radio device. The radio device 100 may also include an output device 108 operable to generate signals to be detected by one or more of the sensors 102. In addition, the radio device includes a radio antenna 110 to enable the reception or transmission of radio signals. The antenna may be considered as both a sensor and an output device. In the sequel, references to sensors and output devices are taken to include the antenna 110.

Certain exemplary embodiments, using different environmental quantities, will now be described. However, is will be apparent to those of ordinary skill in the art that other quantities may be measured as alternative quantities or as additional quantities.

When a device is indoors it will typically be surrounded by surfaces and materials that will scatter radio frequency (RF) energy. In one embodiment, a short pulse or a wideband signal is transmitted from the radio device and the energy profile of the scattered RF signal is measured to determine the existence of nearby scattering surfaces or materials. Surfaces close to the radio device indicate a higher probability or likelihood that the device is inside a building. The antenna 110 may be used as both output device and sensor in this embodiment.

Figure 2:
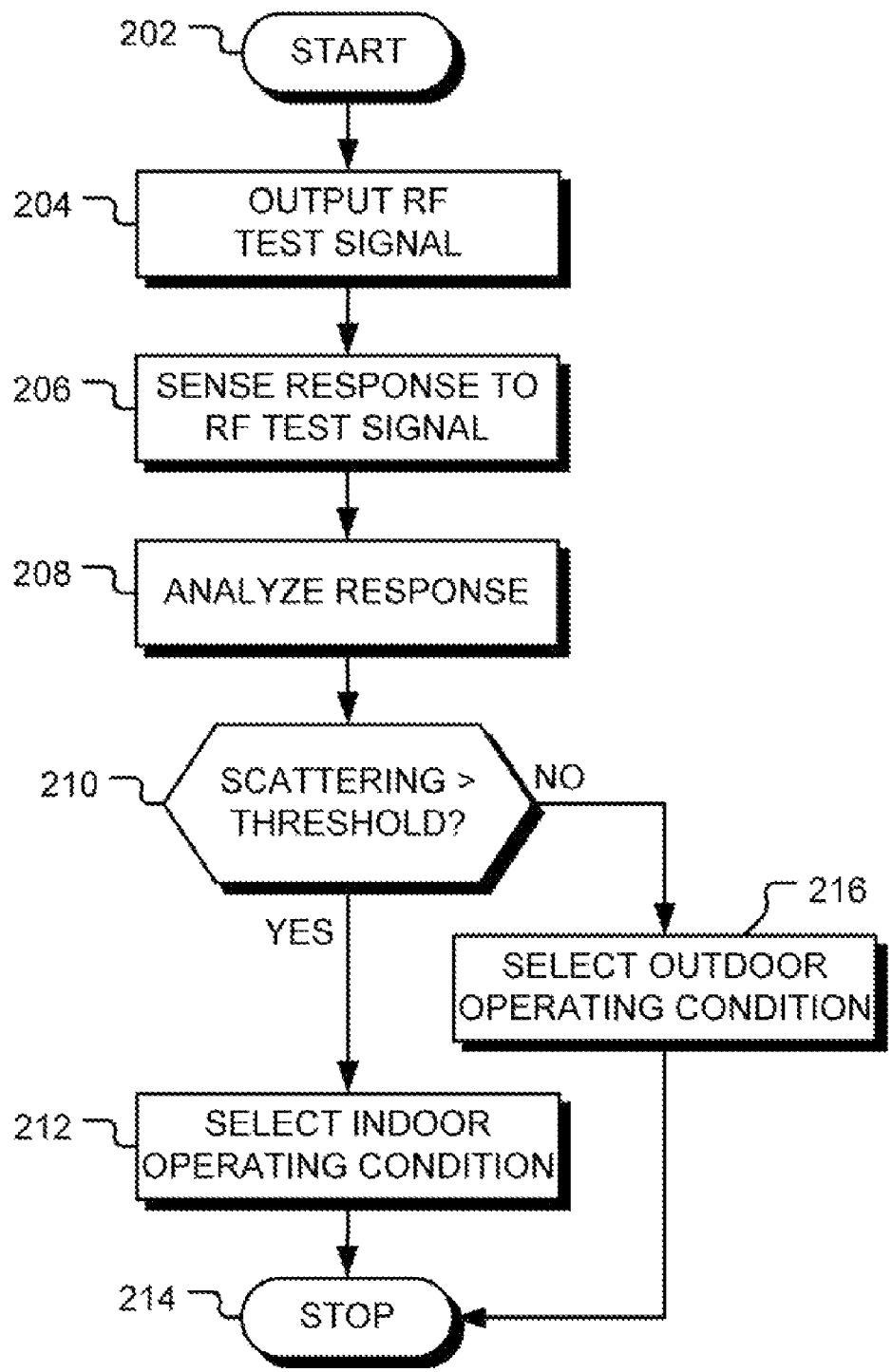
FIG. 2 is a flow chart of a method for optimizing radio performance in accordance with some embodiments of the invention.

FIG. 2 is a flow chart of a method of operation consistent with this embodiment. Following start block 202 in FIG. 2, an RF test signal is output from the radio device at block 204. At block 206, the response to the RF test signal is sensed. This response is due to scattering of the RF test signal by nearby surfaces. A block 208 the response is analyzed to determine the degree of scattering. At decision block 210, the amount of scattering is compared to a threshold. If the scattering is greater than the threshold, as depicted by the positive branch from decision block 210, an indoor operating condition is selected at block 212. This may involve, for example, selecting a lower operating frequency for a wide area network connection. The process then terminates at block 214. If the scattering is not greater than the threshold, as depicted by the negative branch from decision block 210, an outdoor operating condition is selected at block 216. This may involve, for example, selecting a higher operating frequency. Again, the process terminates at block 214.

Figure 3:
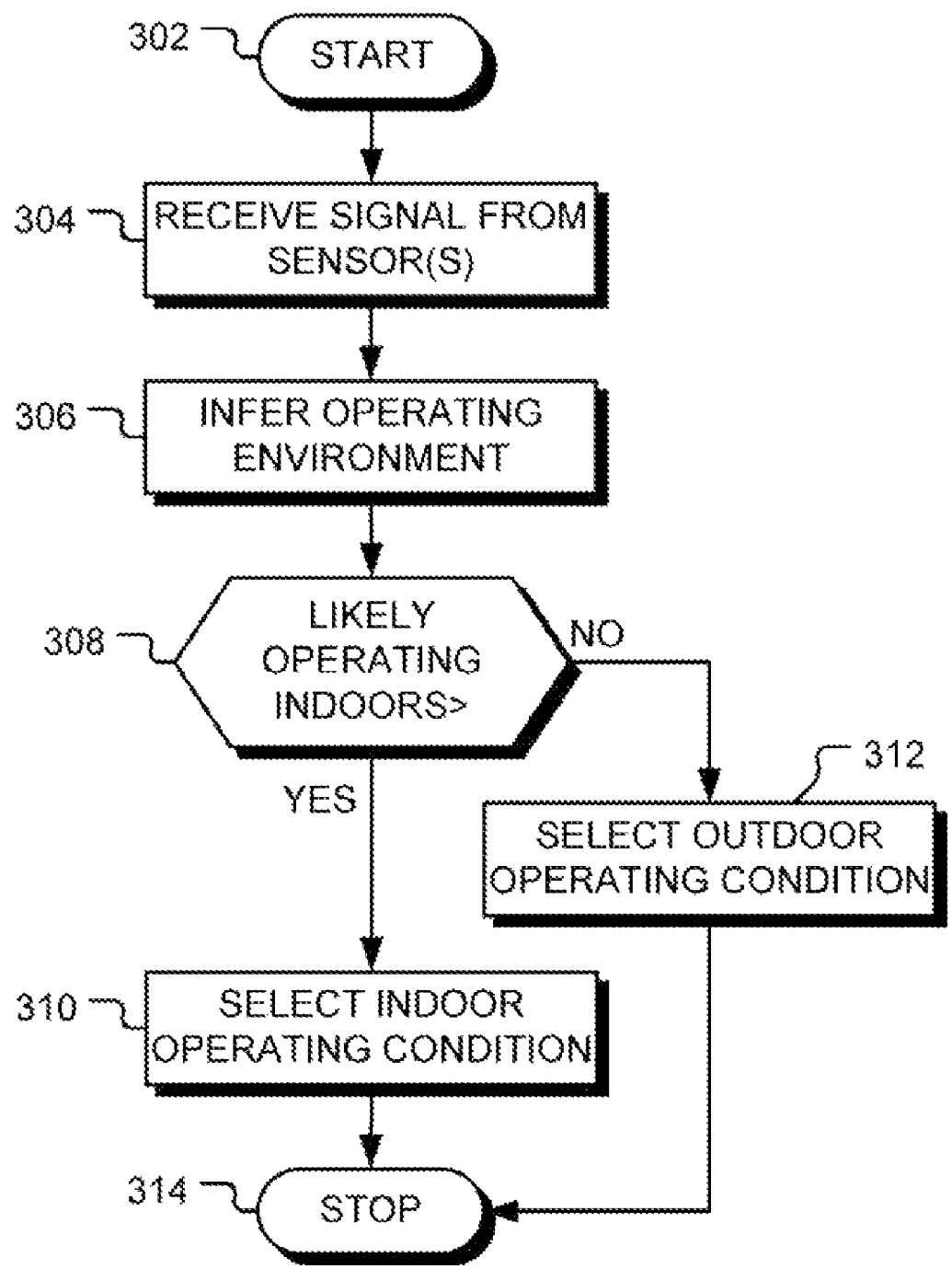
FIG. 3 is a flow chart of a further method for optimizing radio performance in accordance with some embodiments of the invention.

In further embodiments, the radio device infers the likely operating environment using one or more passive sensors. FIG. 3 is a flow chart of a method for inferring operating environment using passive sensors. Following start block 302 in FIG. 3, signals from one or more sensors are received at block 304. At block 306, the sensor signals are analyzed to determine if the radio device is likely operating indoors or outdoors. If the radio device is likely operating indoors, as depicted by the positive branch from decision block 308, an indoor operating condition is selected at block 310. Otherwise, as depicted by the negative branch from decision block 308, an outdoor operating condition is selected at block 312. The process terminates at block 314.

In a further embodiment, the loss of reception of one or more satellite signals, such as a global positioning system (GPS) signal can indicate that a device is more likely to be indoors. In this embodiment, a sensor is a satellite receiver and the sensed satellite signal is examined for expected outdoor signal components, In a still further embodiment, the ambient temperature is measured to provide a measured, or sensed, temperature signal. The ambient temperature in an indoor environment is often controlled to fall in a narrow, prescribed range. The sensed temperature signal indicating a temperature at or near "room temperature" means greater likelihood that a device is indoors. In this embodiment, a sensor is a temperature sensor.

In a still further embodiment, RF energy is detected over a broad frequency range. The relative levels between the high frequency RF energy and low frequency RF energy in the sensed RF signal provides an indication of whether the device is indoors or outdoors. In this embodiment, the antenna may be used as an RF sensor.

In a still further embodiment, light levels or color temperature can indicate the presence of artificial lighting. In this embodiment, the sensors may include one or more light-sensors having sensitivity to light of different wavelengths. The measured light level may be compared to the level of light expected outdoors at the particular time of day. A measured light level that is inconsistent with the time of time may indicate that the radio device is inside a building.

These measurements may be used in combination to allow a joint probability or likelihood to be determined. The inference unit (104 in FIG. 2) can be used to combine the inputs from the sensors (102 and/or 110 in FIG. 2). The inference unit can use simple voting, for example. Other joint probability calculations will be apparent to those of ordinary skill in the art. The inference unit may be implemented, for example, as an analog or digital circuit or a programmed device. The inference unit may be integrated with the controller or processor of the radio device.

Figure 4:
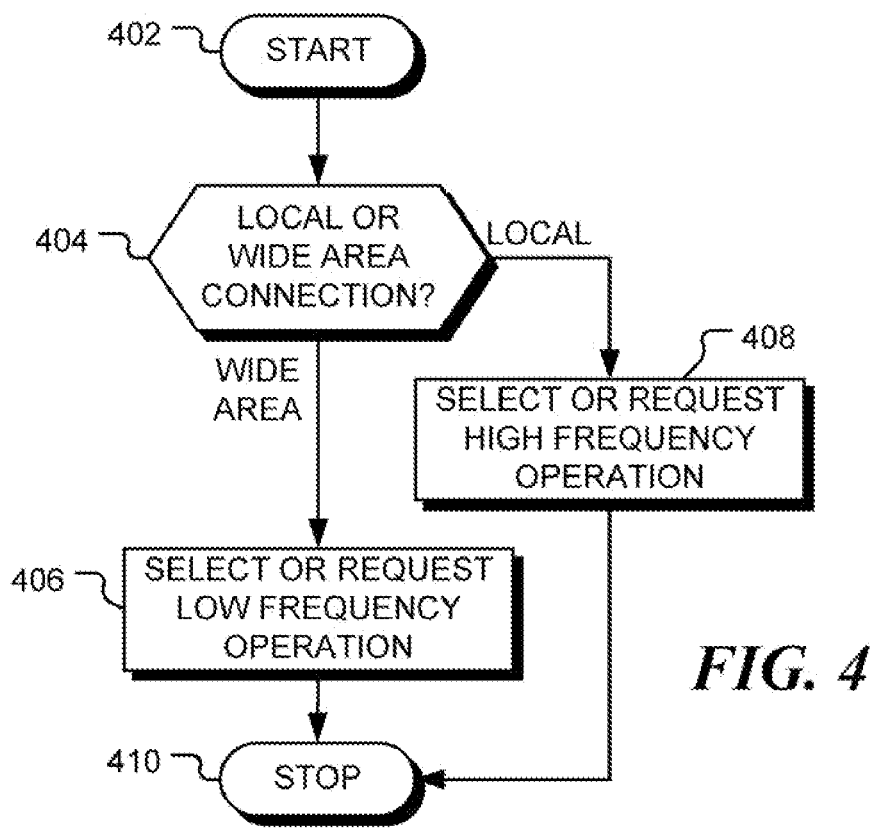
FIG. 4 is a flow chart of a method for selecting in-building radio operation in accordance with some embodiments of the invention.

Once the radio device determines that it is likely in an indoor environment, it may select its operating condition accordingly. FIG. 4 is a flow chart of a method for selecting the indoor operating condition once it has been determined that the device is indoors. Following start block 402 in FIG. 4, the radio device determines at decision block 404 if it needs to connect to a wide area network (outside of the building, for example) or to a local device (inside the same building for example). If it needs to connect to wide area network, as depicted by the WIDE AREA branch from decision block 404, it can select a useful lower frequency with better in-building penetration at block 406. The selection can be made after a search of available frequencies. Alternatively, the radio device can make requests to operate at a lower frequency at block 406. If the radio device determines that it needs to connect to a local device over a short range (i.e. make a local connection), as depicted by the LOCAL branch from decision block 404, it can select to operate at a higher frequency, if desired, at block 408 so as to avoid interference from strong wide area transmitters. The process terminates at block 410.

It will be apparent to those of ordinary skill that modulation modes other than frequency modulation may be used. Code modulation and spread spectrum modulation are examples. When inside a building, the radio device may select between the various available modulation modes to find the modulation mode that provides the best performance. It is to be understood that the radio device may include a transmitter that modulates a signal and/or a receiver that demodulates a signal, each of which operate according to a selected modulation mode.

By knowing its location more accurately, a device can switch to a modulation mode that allows the device to maintain communications while indoors. There is no need for a building to have WLAN devices installed. The device can operate with more reliability for both wide area as well as short range communications based on knowing that it is indoors. The device can also alert a network of this change in the devices knowledge or awareness of its location and request to operate using a more suitable operating frequency or modulation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radio device comprising:
a sensor operable to sense a environmental quantity relating to the environment of the radio device to produce a sensor signal;
an inference unit responsive to the sensor signal and operable to infer a probability of the radio device being inside a building, the inference being dependent upon the environmental quantity, wherein the sensor comprises a light sensor to measure a level of light of the sensor signal, and the inference unit is operable to infer that the radio device is inside the building by comparing the measured level of light with an outdoor level of light expected at a corresponding time of a day; and
a processor operable to control the modulation mode of the radio device, dependent upon the probability of the radio device being inside a building, to optimize performance of the radio device, wherein the processor selects a lower operating frequency, with better in-building penetration, from available frequencies associated with a wide area network when the radio device is inside the building and a wide area network connection is required, and the processor selects a higher operating frequency, having less interference, from available frequencies associated with a local device when the radio device is inside the building and a connection with the local device is required.

2. A radio device in accordance with claim 1, further comprising a radio frequency (RF) output device operable to emit an RF signal, wherein the sensor comprises an RF sensor operable to sense RF signals scattered by objects in the environment of the radio device.

3. A radio device in accordance with claim 2, wherein the inference unit is operable to infer that the radio device is inside the building when the sensed RF signals are greater than a threshold.

4. A radio device in accordance with claim 1, wherein the sensor comprises a satellite receiver for sensing a satellite signal, and wherein the inference unit is operable to infer that the radio device is inside the building when the sensed satellite signal is less than a threshold.

5. A radio device in accordance with claim 1, wherein the sensor comprises a temperature sensor for sensing a temperature signal, and wherein the inference unit is operable to infer that the radio device is inside the building when the sensed temperature signal is within a prescribed range.

6. A radio device in accordance with claim 1, wherein the sensor comprises at least one light sensor for sensing light, and wherein the inference unit is operable to infer that the radio device is inside the building when the sensed light is characteristic of artificial light.

7. A radio device in accordance with claim 1, wherein the processor is operable to select the higher operating frequency from available frequencies associated with the local device when radio device is inside the building and a connection with the local device is required.

8. A method for optimizing performance of a radio device, the method comprising:
measuring an environmental quantity relating to the environment of the radio device using a sensor of the radio device, the environmental quantity comprising a level of light;
comparing the measured level of light with an outdoor level of light expected at a corresponding time of a day;
inferring, from a result of the comparison, a probability of the radio device being inside a building; and
when the radio device is determined to be inside a building:
selecting a lower operating frequency, with better in-building penetration, from available frequencies associated with a wide area network for the radio device when a wide area network connection is required; and
selecting a higher operating frequency, having less interference, from available frequencies associated with a local device for the radio device when a connection with the local device is required.

9. A method in accordance with claim 8, further comprising the radio device emitting a radio frequency (RF) signal, wherein the environmental quantity comprises an RF signal scattered by objects in the environment of the radio device.

10. A method in accordance with claim 9, wherein inferring the probability of the radio device being inside the building comprises comparing the scattered RF signal to a threshold.

11. A method in accordance with claim 8, wherein measuring the environmental quantity relating to the environment of the radio device comprises measuring a satellite signal, and wherein inferring the probability of the radio device being inside the building comprises comparing the satellite signal to a threshold.

12. A method in accordance with claim 8, wherein measuring the environmental quantity relating to the environment of the radio device comprises measuring ambient light falling on the radio device, and wherein inferring the probability of the radio device being inside the building comprises determining when the measured light includes artificial light.

13. A method in accordance with claim 8, wherein measuring the environmental quantity relating to the environment of the radio device comprises measuring ambient light falling on the radio device, and wherein inferring the probability of the radio device being inside the building by comparing the measured ambient light with an outdoor light expected at a corresponding time of a day.

14. A method in accordance with claim 8, wherein measuring the environmental quantity relating to the environment of the radio device comprises measuring the ambient temperature, and wherein inferring the probability of the radio device being inside the building comprises comparing the measured temperature to a range of room temperatures.

15. A method in accordance with claim 8, wherein measuring an environmental quantity comprises measuring a plurality of environmental quantities and wherein inferring a probability of the radio device being inside the building is dependent upon the plurality of environmental quantities.

16. A method in accordance with claim 8, further comprising the radio device alerting a network when the radio device determined to be inside the building.

* * * * *